C. H. WITTHOEFFT.
MOLD FOR USE IN ERECTING CONCRETE WALLS.
APPLICATION FILED NOV. 27, 1907.
916,084. Patented Mar. 23, 1909.
7 SHEETS—SHEET 1.
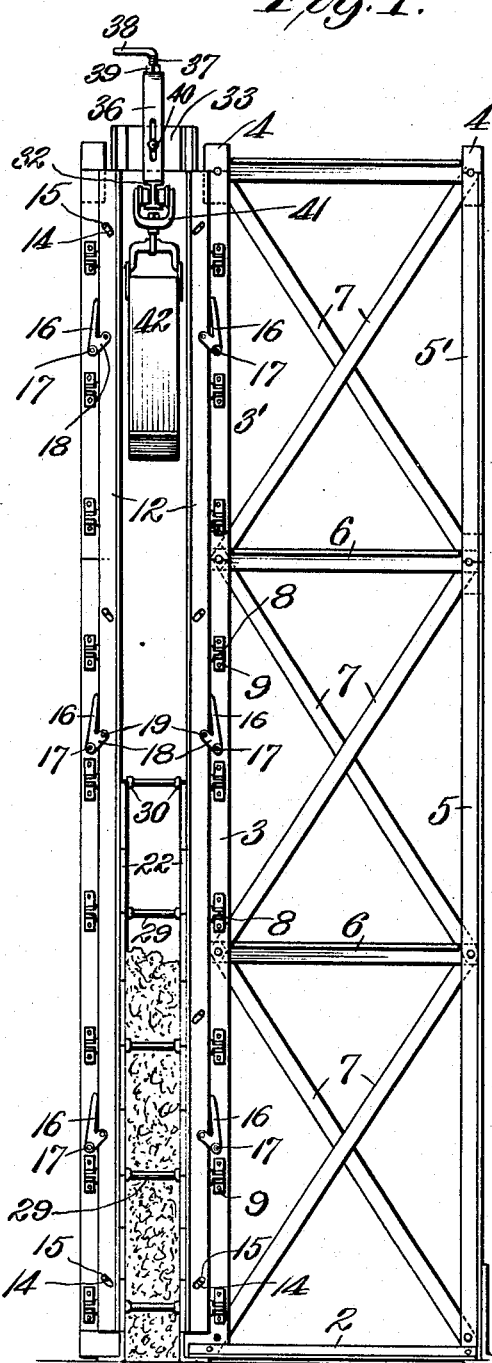
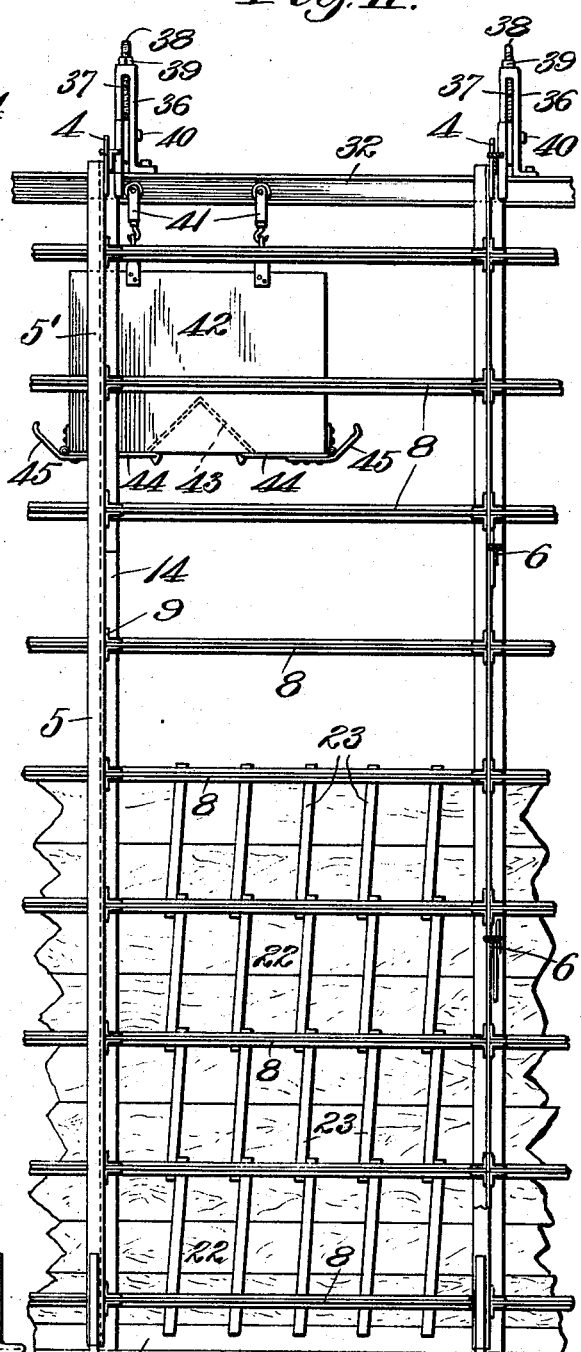
Attest:
Wm H Scott
Lily Rost
Inventor:
Chas. H. Witthoefft,
by Geo W Knight
atty.

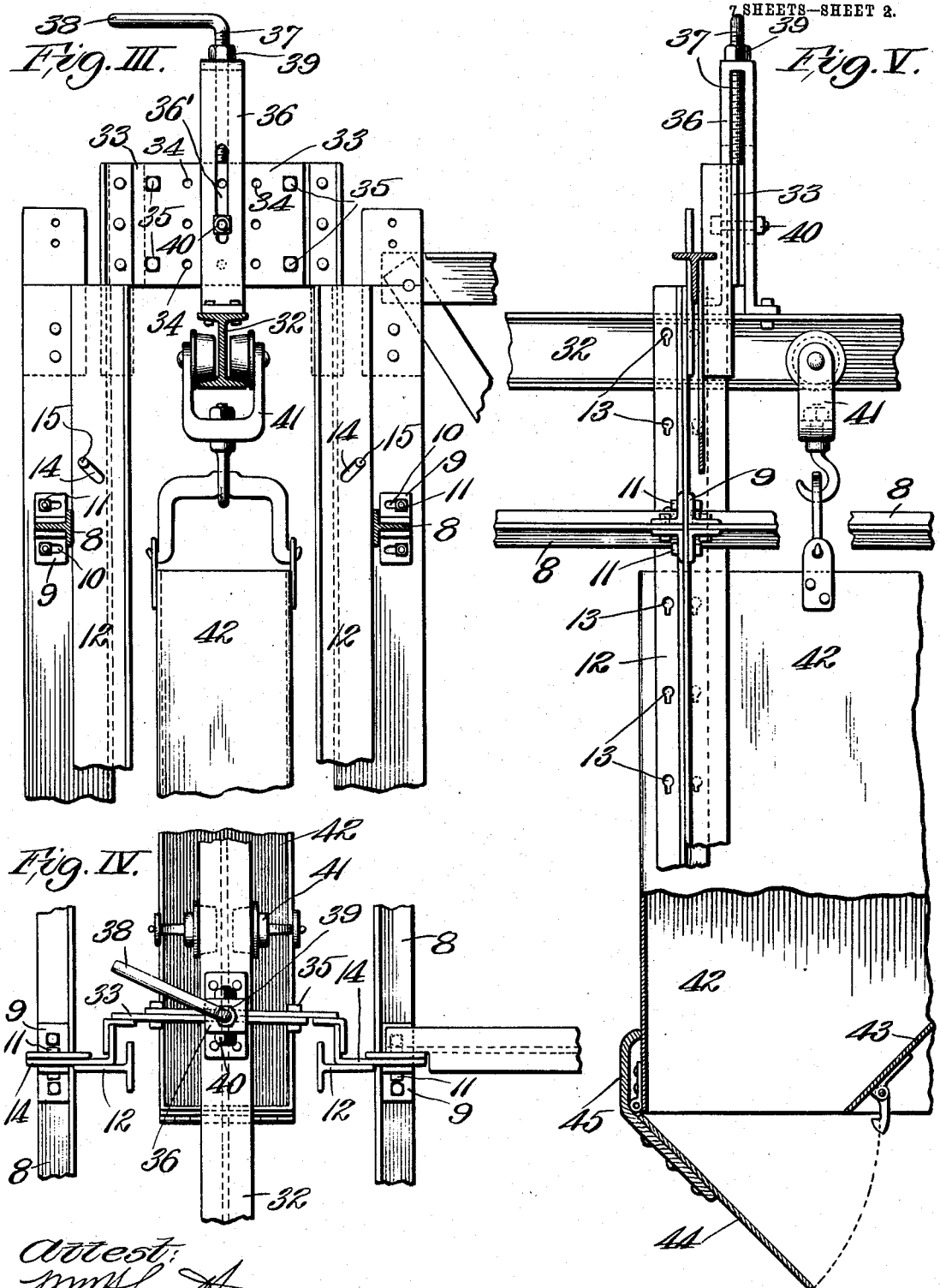

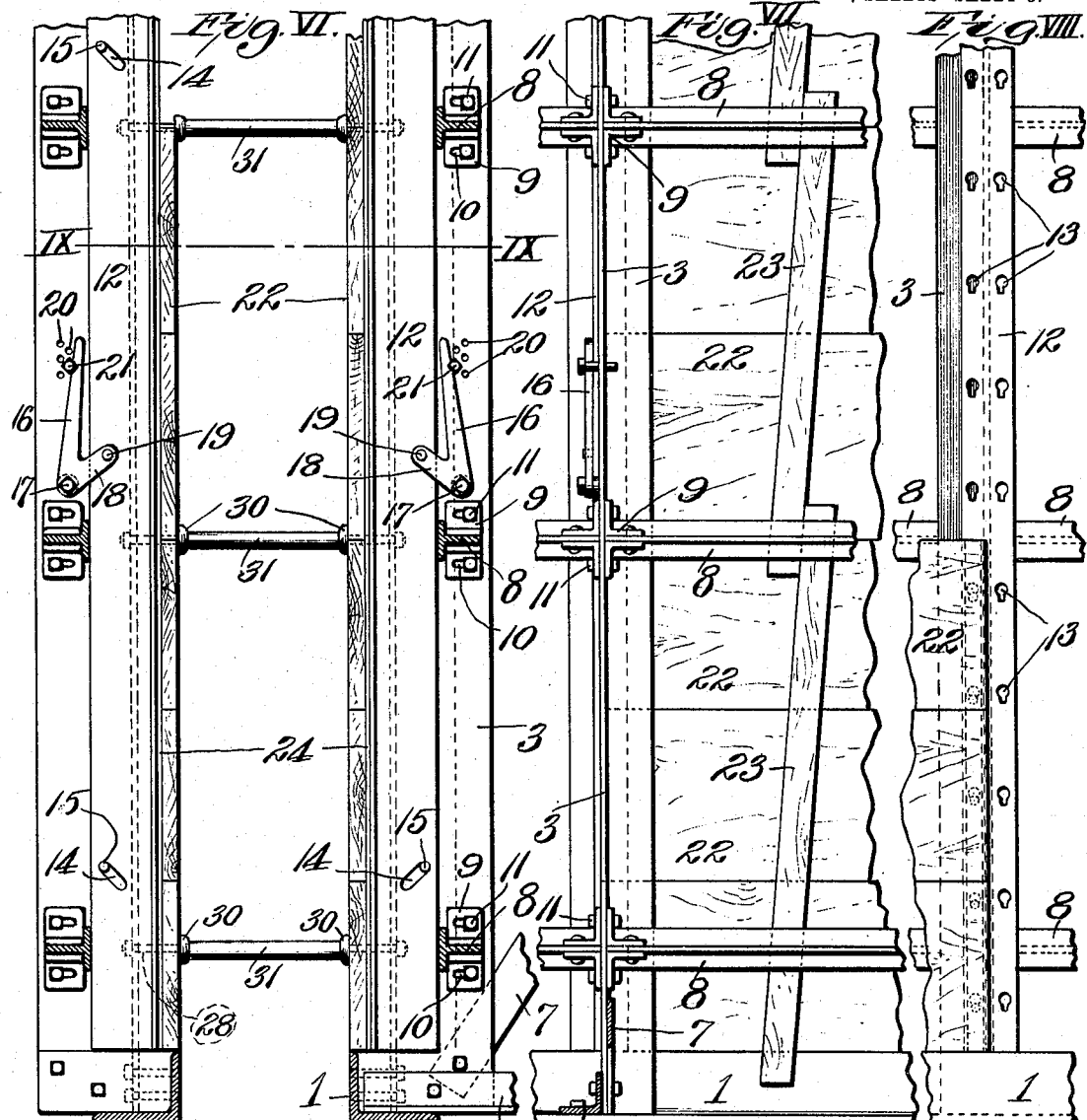

C. H. WITTHOEFFT.
MOLD FOR USE IN ERECTING CONCRETE WALLS.
APPLICATION FILED NOV. 27, 1907.
916,084.
Patented Mar. 23, 1909.
7 SHEETS—SHEET 4.
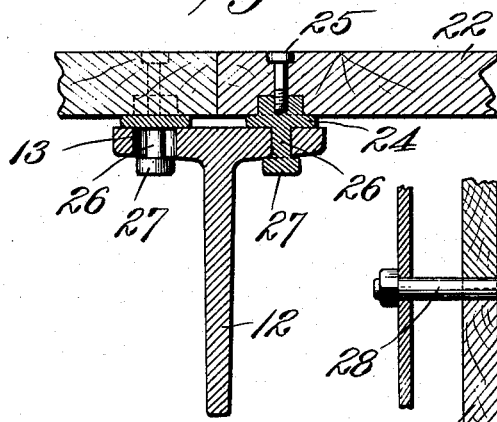
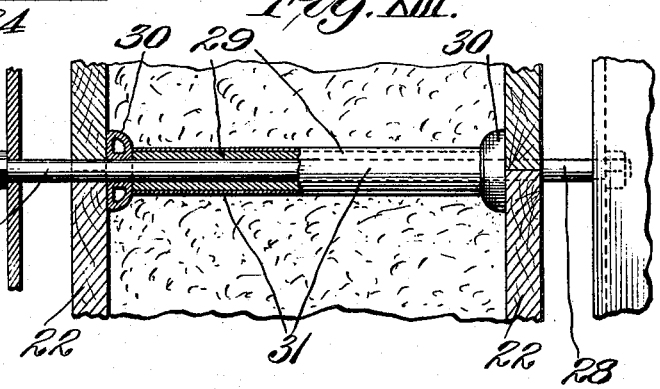
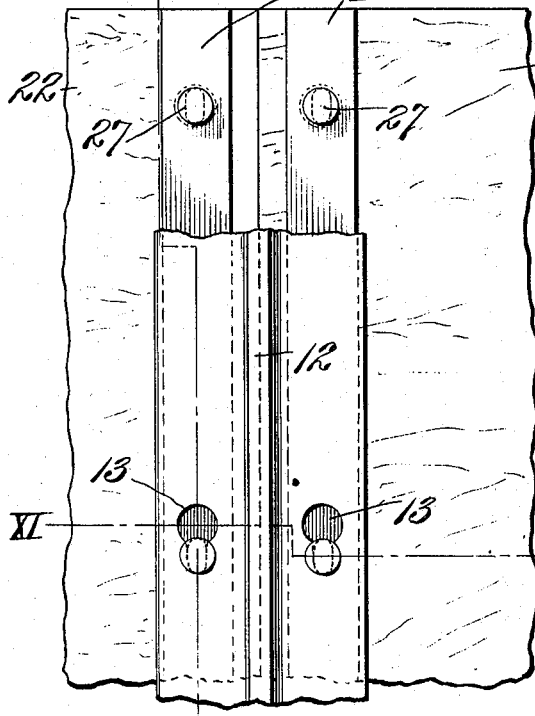
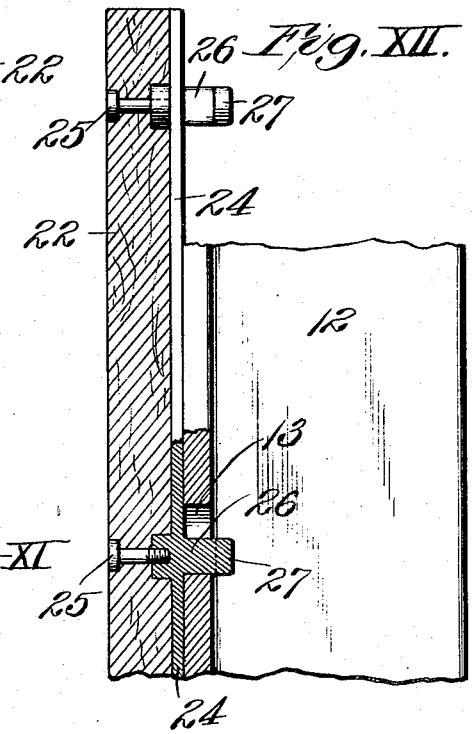

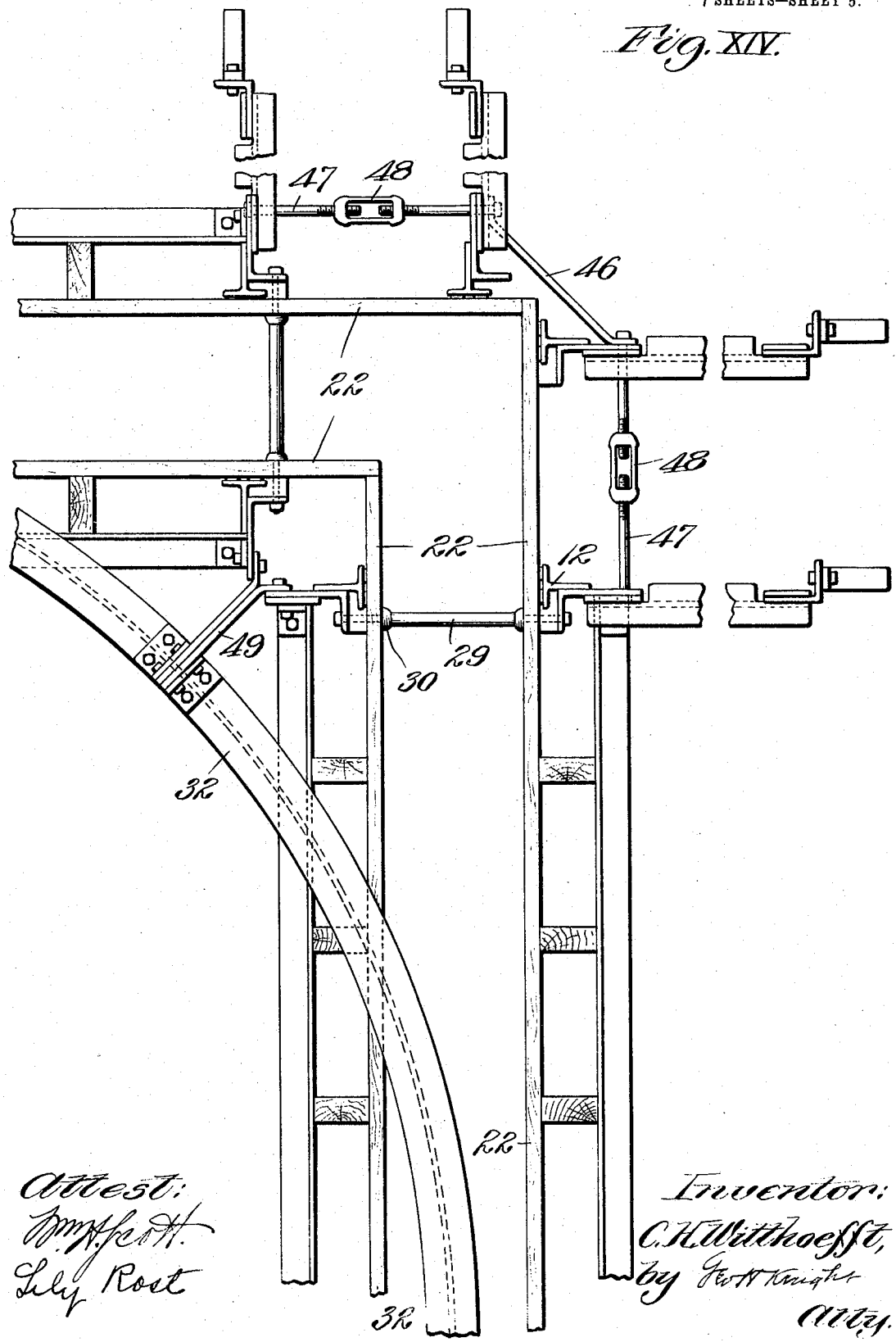

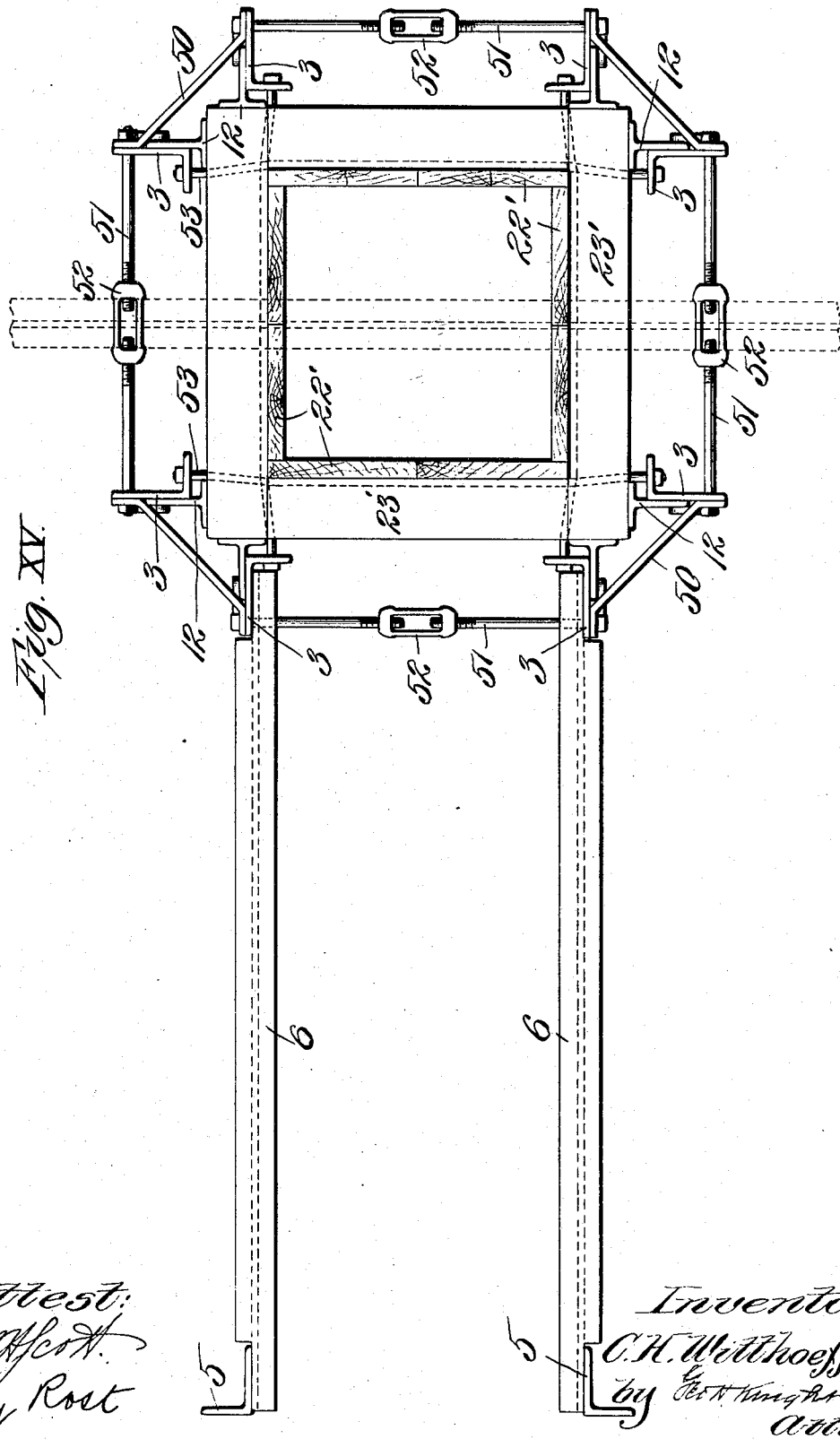

C. H. WITTHOEFFT.
MOLD FOR USE IN ERECTING CONCRETE WALLS.
APPLICATION FILED NOV. 27, 1907.
No. 916,084.
Patented Mar. 23, 1909.
7 SHEETS—SHEET 7.
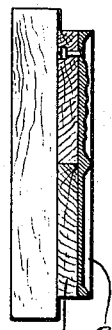
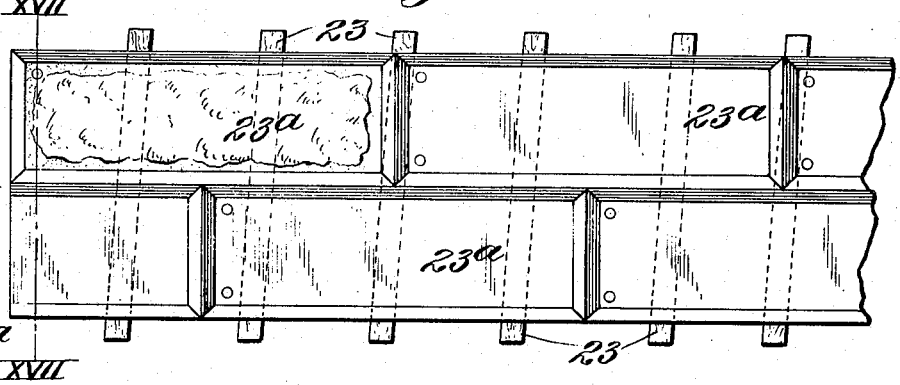
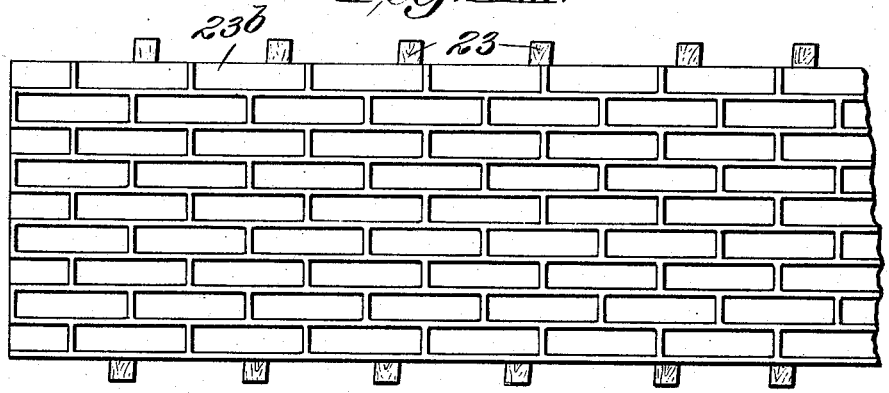
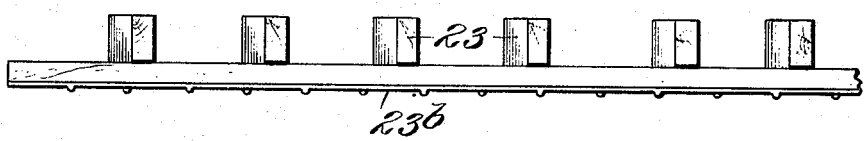

UNITED STATES PATENT OFFICE.

CHARLES H. WITTHOEFFT, OF ST. LOUIS, MISSOURI, ASSIGNOR TO THE WEBER COMPANY, OF CHICAGO, ILLINOIS, A CORPORATION.

MOLD FOR USE IN ERECTING CONCRETE WALLS.

No. 916,084.      Specification of Letters Patent.      Patented March 23, 1909.

Application filed November 27, 1907. Serial No. 404,017.

*To all whom it may concern:*

Be it known that I, CHARLES H. WITTHOEFFT, a citizen of the United States of America, residing in the city of St. Louis and State of Missouri, have invented certain new and useful Improvements in Molds for Use in Erecting Concrete Walls, of which the following is a full, clear, and exact description, reference being had to the accompanying drawings, forming part of this specification.

My invention relates to a mold for use in constructing walls of buildings, or other structures of concrete and the present improvements relate more particularly to the construction of the mold board carriers, the mold boards, means for adjusting the mold board carriers, adjustable means for separating the mold boards at the sides of the wall space and the traveler rail supports.

Figure I is an end elevation of my mold. Fig. II is a side elevation of the mold. Fig. III is an enlarged elevation of the upper end of the mold and one of the traveler rail supports, the adjustable brace bars being shown in cross section. Fig. IV is a top or plan view of the parts shown in Fig. III. Fig. V is a side elevation of the parts shown in Fig. III. Fig. VI is an enlarged vertical cross section taken through the lower portion of the mold. Fig. VII is a side elevation of the parts shown in Fig. VI. Fig. VIII is an elevation of the lower part of one of the main stanchions, the lower part of one of the mold board carriers and fragments of the mold boards and brace bars. Fig. IX is a horizontal section taken on line IX—IX, Fig. VI. Fig. X is an enlarged elevation showing the outer sides of fragments of two adjoining mold boards and one of the mold board carriers. Fig. XI is a horizontal cross section taken on line XI—XI, Fig. X. Fig. XII is a vertical section taken on line XII—XII, Fig. X. Fig. XIII is an enlarged view partly in vertical section and partly in elevation of fragments of mold boards at opposite sides of the wall space, one of the tie rods connecting the frameworks of the mold and one of the division devices utilized between the space of mold boards. Fig. XIV is a top or plan view illustrating the structural features employed in producing the corner of a building or other wall. Fig. XV is a top or plan view illustrating the structural features employed in constructing a column or pillar. Fig. XVI is a face view of a mold board having a face configuration suitable for use in producing a wall face simulating stone work. Fig. XVII is a cross section taken on line XVII—XVII, Fig. XVI. Fig. XVIII is a face view of a mold board for use in constructing a wall having a face simulating brick work. Fig. XIX is an edge view of the mold board shown in Fig. XVIII.

My mold contemplates the use of two complementary structures that are utilized at opposite sides of a space in which a concrete wall is to be erected and which structures are preferably of similar construction and provision is made for the up-building of the structures to any desired height by making the members of the structures of sections which are united to the lower members and to each other.

1 designates the main sills of the frameworks of my mold which are adapted to be placed longitudinally of the space in which a concrete wall is to be erected and 2 are brace sills that extend laterally from the main sills and which are preferably arranged at right angles thereto.

3 are lower main stanchion sections which are secured to the main sills and are suitably spaced apart. These stanchion sections are preferably of L-shape. 3' are extension main stanchion sections that surmount the lower stanchion sections 3 to which they are secured by splice plates 4. The lower sections 3 and the extension sections 3' constitute the main stanchions of my mold framework and said framework may be extended to any desired height by the use of the requisite number of extension sections.

5 designates lower stay stanchion sections that are secured at their lower ends to the brace sills 2 and 5' are extension stanchion sections similar to the sections 3' and which may be used in numbers corresponding to the number of said extensions 3' and be connected to the lower stay section and to each other by splice plates 4. As the framework is built up the lower main stanchion sections and the lower stay stanchion sections and also the extension main stanchion and stay stanchion sections are united to each other by horizontally disposed tie bars 6 and diagonally disposed tie bars 7.

8 designates brace or tie bars that serve to unite the main stanchions of the framework of the mold and which also have a function that will be hereinafter particularly referred to. These brace or tie bars are provided at their ends with out-turned lips 9 preferably produced by the attachment of angle plates to the bars and in each one of said lips is a slot 10 (see Figs. III and VI) which extends horizontally when the bars are in position between the main stanchions. The bars 8 are adjustably attached to the main stanchions by binding bolts 11 which serve to hold the bars in fixed positions after they have been adjusted horizontally between the stanchions for a purpose to be hereinafter stated.

12 designates mold board carriers preferably of T-shape and in which are slots 13 preferably of key-hole shape. Where the carriers 12 are made of T-shape the slots 13 are produced therein in the wings of the carriers, as seen in Figs. V, VII, IX, X and XI. The carriers 12 are located alongside of the main stanchions of my framework and they are adapted to be shifted inwardly relative to the space in which a concrete wall is to be erected and retracted after they have been so shifted. In each mold board carrier are inclined slots 14 which extend downwardly and inwardly in the bodies of the carriers and are adapted to receive guide studs 15 that project from the main stanchions, see Figs. I, III and VI. All of said carriers are disposed between the brace or tie bars 8 and the inner faces of the main stanchions so that said carriers may be held from movement after they have been adjusted inwardly relative to the wall space. The carriers are shifted by means of levers 16 that are pivoted at 17 to the main stanchions and which are provided with arms 18 that are pivotally connected at 19 to the carriers 12, as seen in Figs. I and VI. To provide for the levers 16 being held from movement after they have been operated to shift the mold board carriers inwardly, I produce in the main stanchions pin-holes 20 that are adapted to receive pins 21, see Figs. VI and VII, that may be introduced into either of the pin-holes back of the handles of the levers 16. Any other suitable means for holding the levers may, however, be employed.

22 designates mold boards that are adapted to be supported by the mold board carrier 12 at the sides of the space in which a concrete wall is to be erected. These mold boards are preferably connected in sets by stiffener strips 23 that are secured to the outer sides of the boards and which serve as means for alining the various boards due to their being extended at their ends beyond the boards to which they are attached in order that they will lap onto the adjoining boards of other sets when the boards are assembled at the inside faces of the mold board carriers. The various mold boards have secured to them stem carrying strips 24, see Figs. IX to XII inclusive, preferably attached to the boards by screws 25, see Figs. XI and XII. The strips 24 are provided with stems 26 which project outwardly from the strips at suitable intervals and terminate in heads 27. These stems 26 are spaced apart upon the stem carrying strips distances corresponding to the distances of separation of the slots in the mold board carriers 12 that are adapted to receive said stems for the connection of the mold boards to said carriers. It will be seen that the provision of the slots in the mold board carriers and the provision of the stem carrying strips 24 and the stems of said strips provide means whereby the mold boards may be readily and quickly attached to the mold board carriers in building up the walls of the mold consisting of the mold boards and also that said mold boards may be disconnected from the carriers when occasion demands— for instance, when the mold is to be dismantled after a concrete wall has been molded or at any other time.

28 designates tie rods that are mounted in the main stanchions of the two sections of framework employed in my mold at opposite sides of a space in which a wall is to be erected and which serve to tie these sections to each other and hold them in a tied condition during the process of erecting the wall. The tie rods are adapted to pass through the mold board 22 or mold walls. Each tie rod is surrounded by a distance or separating sleeve 29 located between the two sets of mold boards, see Figs. I, VI, IX and XIII, and also by washers 30 that are larger than said sleeves and are interposed between the ends of the sleeves and the mold boards. The distance members 29 and 30 serve to hold the mold boards separated to the proper degree in order that the space between them in which a concrete wall is to be erected may be made uniform throughout, and said members are adapted to be removed from the wall after they have become embedded therein by the molding of the concrete around them. The washers 30 being located at the exterior faces of the wall may be readily extracted from the wall after the mold is dismantled or separated from the wall and to provide against sleeves 29 becoming cemented in the wall in a manner to preclude their extraction, place around each sleeve before the concrete is molded around it a covering 31 of paper or other suitable material that prevents contact of the concrete with the sleeve from which covering the sleeves may be driven in extracting them from the wall. After the distance members 29 and 30 have been removed the ends of the openings in the wall, that have been produced by these members being molded in the wall, may be readily filled with cement if desired. The washers 30 are utilized for the purpose of affording larger bearings against the mold board than would be afforded by the sleeves 29 without making the sleeves large in diameter.

To provide for the conveyance of concrete into the wall space within the mold by the means of buckets and travelers supporting said buckets, I utilize a traveler rail and means supported by the framework of the mold for supporting said traveler rail.

32 designates the traveler rail.

33 are bearer plates that are adapted to be secured to the main stanchions at either the upper ends of the lower sections 3 or the upper ends of the extension sections of said stanchions. These plates are arranged in pairs and may be secured to the stanchions in any suitable manner, such as by the employment of bolts. The plates in each pair are complementary to each other and are provided with bolt-holes 34 through which binding bolts 35 may be passed to connect the plates as seen in Figs. III and IV. Each plate contains a plurality of bolt-holes 34 thus making provision for the adjustment of the plates relative to each other in order that the traveler rail bearer composed of said plates may be contracted or widened to suit the width of a wall that is to be erected in the use of my mold.

36 are hanger stirrups of inverted U-shape that straddle the pairs of bearer plates 33 and to the lower ends of which the traveler rail 32 is attached. These hanger stirrups are adjustably supported in order that they may be raised and lowered to provide a suitable drop in the traveler rail and render its course an inclined one to facilitate the travel of the travelers that operate on said rail. The means I employ for the vertical adjustment of the hanger stirrups is an adjustment screw 37 mounted in the upper end of each stirrup and provided with a handle 38 and the lower end of which is adapted to bear upon the top edges of the bearer plates 33. It will be seen that when the adjustment screw 37 is operated it will act to raise or lower the hanger stirrups as may be desired.

39 are jam nuts fitted to the adjustment screws above the hanger stirrups and by which said screws may be held from movement after they have been adjusted. To prevent lateral movement of the hanger stirrups on the bearer plates I provide stay bolts 40 that are mounted in the bearer plates and which extend through vertical slots 36' in the hanger stirrups.

41 designates the travelers that operate upon the traveler rail 32 and 42 is one of the buckets that are supported by said travelers 41 and in which concrete is conveyed to the wall space inclosed by the mold. Each bucket has an open lower end and is provided with a centrally inverted V-shaped deflector 43 by which the concrete is deflected into two streams as it is discharged from the bucket.

44 are drop bars that are hinged to the bucket and are provided with rearwardly extending arms 45 adapted to engage the walls of the bucket when the doors are opened. These arms are so disposed as to prevent the doors from moving into vertical positions but cause them to open only into inclined positions in order that the streams of concrete deposited from the bucket at the ends of the deflector 43 will be directed toward each other and into a single stream. The object in so constructing the buckets is to prevent sudden discharge of the concrete from the buckets.

In the use of my mold the frameworks of the mold comprising the sills, the main stanchions, the stay stanchions and the tie members uniting said stanchions are first erected and the mold board carriers 12 are fitted to the main stanchions. The mold boards 22 are then mounted upon the mold board carriers and the tie rods 28 are put in place in the main stanchions with the distance members mounted thereon. The mold board carriers are then shifted inwardly relative to the wall space by the operation of the shift levers 16, thereby causing the mold boards at each side of the wall space to be moved toward each other until they impinge against the distance members on the tie rods 28 and are uniformly held apart by said distance members. The tie or brace bars 8 are next adjusted inwardly toward the wall space to serve as resistance or racing members for the mold boards and the mold board carriers, the former of which are braced by said bars, due to the presence of the brace strips 23 attached to the mold boards.

In Fig. XIV I have shown structural features of my mold as employed in producing the corner of a wall. In this instance the mold boards 22 are arranged at right angles to each other in the different sets at the corner of the wall and are separated by the distance members 29 and 30 in the manner previously explained and the stanchions and other elements of the frame work, as well as the mold board carriers are constructed similarly to those previously described. For the purpose, however, of binding the members of the frameworks that are located at angles to each other I utilize tie bars 46 located at the outer corner of the mold and attached at their ends to the main stanchions of the mold frameworks. I also employ between the main stanchions of each outer set of framework next adjacent to the corner of the mold draw rods 47 having turn buckles 48 incorporated therein and by which the stanchions nearest the corner of the mold may be drawn laterally and away from the corner for the purpose of placing the mold frameworks in proper correlative positions. The traveler rail 32 is curved at the corner of the mold and is supported by strap hangers 49 that are connected to the main stanchions at the inner side of the mold.

In Fig. XV I have shown the structural members of a mold for use in producing columns or pillars. In this construction I employ one set of main stanchions 3 and one set of stay stanchions 5 and tie bars 6 connecting said main and stay stanchions. I also employ additional sets of main stanchions at the sides of the space in which the column or pillar is to be produced aside from that at which the first named main stanchions are utilized. All of the main stanchions are connected at the corners of the mold by tie bars 50 and they are connected at the sides of the mold by draw rods 51 having turn buckles 52 incorporated therein and by which the stanchions may be stayed after the tie bars 50 are connected. The mold boards 22' are placed on end and they have attached thereto stiffener strips 23' disposed horizontally which are fitted to the mold board carriers 12. The stiffener strips overlap each other at the corners of the mold and they are divided into sets in which the strips of each set are parallel with each other. 53 are inner tie rods which connect the main stanchions 3 and which, by bearing against the mold boards, serve as means for affording additional bracing for the mold boards.

In Figs. XVI and XVII I have shown a mold board having a facing suitable for use in the production of a concrete wall surface to imitate stone blocks. In producing mold boards of this description I apply to the mold boards 22 a metal facing plate 23ª that is ribbed to divide it into spaces and so that a corresponding space configuration in simulation of building stone with either rough or smooth exterior surfaces may be produced.

In Figs. XVIII and XIX I have shown a mold board having a metal facing 23ᵇ applied to it and of a configuration that will, in the use of the mold board, produce a concrete wall surface in simulation of brick work.

I claim:

1. In a mold of the character described, the combination of a plurality of stanchions, mold board carriers horizontally movable relative to said stanchions, and mold boards detachably connected to said carriers, substantially as set forth.

2. In a mold of the character described, the combination of a plurality of stanchions, mold board carriers horizontally movable relative to said stanchions, and mold boards provided with means whereby they may be detachably connected to said carriers, substantially as set forth.

3. In a mold of the character described, the combination of a plurality of stanchions, mold board carriers movable relative to said stanchions and having openings therein, and mold boards provided with members adapted to enter the openings in said carriers and connect the mold boards to said carriers, substantially as set forth.

4. In a mold of the character described, the combination of a plurality of stanchions, mold board carriers movable relative to said stanchions and having slots therein, and mold boards provided with stems adapted to enter the slots in said carriers and connect the mold boards to said carriers, substantially as set forth.

5. In a mold of the character described, the combination of a plurality of stanchions, mold board carriers movable relative to said stanchions and having slots therein, and mold boards provided with headed stems adapted to enter the slots of said carriers and connect the mold boards to said carriers, substantially as described.

6. In a mold of the character described, the combination of a plurality of stanchions, mold board carriers movable relative to said stanchions and having slots therein, a plurality of mold boards, stem carrying strips secured to said boards, and stems projecting from said strips adapted to enter the slots in said carriers to connect the mold boards to said carriers, substantially as set forth.

7. In a mold of the character described, the combination of a plurality of stanchions, mold board carriers located adjacent to said stanchions, levers supported by said stanchions and by which said mold board carriers may be moved relative to the stanchions, and mold boards adapted to be supported by said carriers, substantially as set forth.

8. In a mold of the character described, the combination of a plurality of stanchions, mold board carriers located adjacent to said stanchions, means by which said carriers may be moved relative to said stanchions, and mold boards adapted to be supported by said mold board carriers; said carriers being provided with inclined slots and said stanchions being provided with guide studs entering into the slots in the carriers, substantially as set forth.

9. In a mold of the character described, the combination of a plurality of stanchions, mold board carriers horizontally movable relative to said stanchions, mold boards adapted to be supported by said carriers, brace bars adjustably attached to said stanchions and adapted to be moved toward and away from said mold boards, and stiffener strips attached to said mold boards and interposed between the mold boards and brace bars, substantially as set forth.

CHARLES H. WITTHOEFFT.

In presence of—
BLANCHE HOGAN,
LILY ROST.